US012493621B1

(12) United States Patent
Vince et al.

(10) Patent No.: US 12,493,621 B1
(45) Date of Patent: Dec. 9, 2025

(54) COMPUTATIONAL MATCH SYSTEM FOR COMBINATORIAL SOLUTIONS

(71) Applicant: THE BANK OF NEW YORK MELLON, New York, NY (US)

(72) Inventors: Robin A. Vince, New York, NY (US); Sharyn N. Jones, New York, NY (US); Christian F. Steffenroeeren, New York, NY (US); Daniel Globerson, New York, NY (US)

(73) Assignee: THE BANK OF NEW YORK MELLON, New York, NY (US)

( * ) Notice: Subject to any disclaimer, the term of this patent is extended or adjusted under 35 U.S.C. 154(b) by 0 days.

(21) Appl. No.: 18/933,381

(22) Filed: Oct. 31, 2024

Related U.S. Application Data

(60) Provisional application No. 63/571,204, filed on Mar. 28, 2024, provisional application No. 63/595,937, filed on Nov. 3, 2023.

(51) Int. Cl.
*G06F 16/2457* (2019.01)
*G06F 18/24* (2023.01)

(52) U.S. Cl.
CPC .. *G06F 16/24578* (2019.01); *G06F 18/24765* (2023.01)

(58) Field of Classification Search
CPC ............... G06F 16/24578; G06F 16/24765
See application file for complete search history.

(56) References Cited

PUBLICATIONS

A Support System for Selection of Reviewers (Year: 2014).*

* cited by examiner

*Primary Examiner* — Hau H Hoang
(74) *Attorney, Agent, or Firm* — Pillsbury Winthrop Shaw Pittman, LLP

(57) ABSTRACT

Systems and methods obtain an interaction listing for a target individual, in which the interaction listing includes potential evaluators for the target individual, in which each potential evaluator is associated with a score representing a volume of interactions between the potential evaluator and the target individual over a period of time; obtain a functional category designation for each potential evaluator; assign each potential evaluator to an applicable category based on the designation; for each category: create a ranked listing of potential evaluators by ordering the potential evaluators based on their associated scores; and identify a threshold number of potential evaluators from the list; for each identified potential evaluator: determine whether the identified potential evaluator satisfies one or more evaluation constraints; and if so, add the potential evaluator to an evaluation group for the target individual; generate an evaluation request; and provide the request to each potential evaluator within the evaluation group.

19 Claims, 5 Drawing Sheets

FIG. 3

COMPUTATIONAL MATCH SYSTEM FOR COMBINATORIAL SOLUTIONS

CROSS-REFERENCE TO RELATED APPLICATIONS

This application claims priority to U.S. Provisional Patent Application No. 63/595,937, entitled "SYSTEMS AND METHODS FOR PROVIDING EVALUATION REQUESTS", filed on Nov. 3, 2023; and U.S. Provisional Patent Application No. 63/571,204, entitled "SYSTEMS AND METHODS FOR PROVIDING EVALUATION REQUESTS," filed on Mar. 28, 2024, the content of each of which is incorporated by reference in its entirety herein.

BACKGROUND

Combinatorial problems are those in which data objects are arranged with respect to each other. In many instances, combinatorial problems involve assessing different permutations of subsets of data records and selecting from among those combinations according to an optimization strategy or objective. Combinatorial problems and their solutions play a role in various fields, from cryptography, probability theory, graph theory, matching (such as for recommendation and search engines), and others.

SUMMARY

Aspects of the disclosure relate to methods, apparatuses, and/or systems for a computational match system that provides combinatorial solutions to recommend and provide evaluation requests. In some aspects, the techniques described herein relate to a method, including: accessing a list of a plurality of candidate data objects to match with a target data object, each candidate data object from among the plurality of candidate data objects being associated with a candidate score representing a strength or affinity to the target data object for matching; classifying each candidate data object into a respective functional category designation classification from among a plurality of functional category designation classifications; for each classification from among the plurality of functional category designation classifications: generating a ranked listing of candidate data objects in the classification based on associated candidate scores of each candidate data object in the classification; identifying a subset of the ranked listing of candidate data objects based on the ranked listing and a threshold number to limit the subset; evaluating the identified subset against one or more constraints that further limits the number of candidate data objects; and generating an evaluation group for the target data object based on the evaluation.

In some aspects, the techniques described herein relate to a method, wherein each candidate data object from among the plurality of candidate respectively represents a potential evaluator, the target data object represents a target individual, and the evaluation group represents a grouping of evaluators that are automatically recommended to evaluate the target individual.

In some aspects, the techniques described herein relate to a method, wherein classifying each candidate data object includes obtaining an indication of whether the respective potential evaluator is a member of one or more of the following groups: an organizational group to which the target individual belongs; an organizational group to which the target individual does not belong; an enterprise organizational group; and a group of individuals related to a feature associated with the target individual.

In some aspects, the techniques described herein relate to a method, wherein evaluating the identified subset against one or more constraints includes, for each candidate data object in the subset: determining whether one or more of the following criteria is satisfied: the respective potential evaluator has already been selected for the target individual; the respective potential evaluator has been selected to evaluate at least a threshold number of total individuals during an evaluation cycle; an organization rank for the respective potential evaluator does not exceed a threshold value; the organization rank for the respective potential evaluator exceeds a second threshold value; the respective potential evaluator is located in a certain jurisdiction; or the respective potential evaluator has not worked for the organization for more than a threshold period of time.

In some aspects, the techniques described herein relate to a method, further including: generating an evaluation request for the target individual; and providing the evaluation request to each respective potential evaluator in the evaluation group.

In some aspects, the techniques described herein relate to a method, further including: providing the evaluation request to each respective potential evaluator within the evaluation group includes automatically providing the evaluation request to each respective potential evaluator with the evaluation request.

In some aspects, the techniques described herein relate to a method, further including: receiving one or more changes to a composition of the evaluation group from a manager for the target individual.

In some aspects, the techniques described herein relate to a method, wherein receiving one or more changes to the composition of the evaluation group includes receiving: an indication to add an additional potential evaluator to the evaluation group where the additional potential evaluator is associated with one or more of the plurality of categories; or an indication to remove one or more of the respective potential evaluators from the evaluation group.

In some aspects, the techniques described herein relate to a method, further including: receiving one or more changes to a composition of the evaluation group from the target individual.

In some aspects, the techniques described herein relate to a method, wherein receiving one or more changes to the composition of the evaluation group includes receiving: an indication to add an additional potential evaluator to the evaluation group where the additional potential evaluator is associated with one or more of the plurality of functional category designation classifications; or an indication to remove one or more of the respective potential evaluators from the evaluation group.

In some aspects, the techniques described herein relate to a method, further including: receiving one or more changes to a composition of the evaluation group, wherein the one or more changes are received from the target individual or a manager for the target individual, and wherein the one or more changes include an indication to add an additional potential evaluator who is not associated with any of the functional category designation classifications.

In some aspects, the techniques described herein relate to a system, including: one or more code sets stored in memory and executed by the one or more processors, which, when executed, configure the one or more processors to: access a list of a plurality of candidate data objects to match with a target data object, each candidate data object from among the plurality of candidate data objects being associated with a candidate score representing a strength or affinity to the target data object for matching; classify each candidate data object into a respective functional category designation classification from among a plurality of functional category designation classifications; for each classification from among the plurality of functional category designation classifications: generate a ranked listing of candidate data objects in the classification based on associated candidate scores of each candidate data object in the classification; identify a subset of the ranked listing of candidate data objects based on the ranked listing and a threshold number to limit the subset; evaluate the identified subset against one or more constraints that further limits the number of candidate data objects; and generate an evaluation group for the target data object based on the evaluation.

In some aspects, the techniques described herein relate to a system, wherein each candidate data object from among the plurality of candidate respectively represents a potential evaluator, the target data object represents a target individual, and the evaluation group represents a grouping of evaluators that are automatically recommended to evaluate the target individual.

In some aspects, the techniques described herein relate to a system, wherein to classify each candidate data object, the one or more processors are further configured to: obtain an indication of whether the potential evaluator is a member of one or more of the following groups: an organizational group to which the target individual belongs; an organizational group to which the target individual does not belong; an enterprise organizational group; and a group of individuals related to a feature associated with the ratee.

In some aspects, the techniques described herein relate to a system, wherein to evaluate the identified subset against one or more constraints, the one or more processors are further configured to, for each candidate data object in the subset: determine whether one or more of the following criteria is satisfied: the respective potential evaluator has already been selected for the target individual; the respective potential evaluator has been selected to evaluate at least a threshold number of total individuals during an evaluation cycle; an organization rank for the respective potential evaluator does not exceed a threshold value; the organization rank for the respective potential evaluator exceeds a second threshold value; the respective potential evaluator is located in a certain jurisdiction; or the respective potential evaluator has not worked for the organization for more than a threshold period of time.

In some aspects, the techniques described herein relate to a system, wherein the one or more processors are further configured to: generate an evaluation request for the target individual; and provide the evaluation request to each respective potential evaluator in the evaluation group.

In some aspects, the techniques described herein relate to a system, wherein to provide the evaluation request to each respective potential evaluator within the evaluation group, the one or more processors are further configured to automatically provide each respective potential evaluator with the evaluation request.

In some aspects, the techniques described herein relate to a system, wherein the one or more processors are further configured to: receive one or more changes to a composition of the matched group from a manager for the target individual.

In some aspects, the techniques described herein relate to a system, wherein to receive one or more changes to the composition of the evaluation group includes, the one or more processors are further configured to receive: an indication to add an additional potential evaluator to the evaluation group where the additional potential evaluator is associated with one or more of the plurality of categories; or an indication to remove one or more of the respective potential evaluators from the evaluation group.

In some aspects, the techniques described herein relate to a system, wherein the one or more processors are further configured to: receive one or more changes to a composition of the matched group from the target individual.

In some aspects, the techniques described herein relate to a system, wherein to receive one or more changes to the composition of the matched group includes, the one or more processors are further configured to receive: an indication to add an additional potential evaluator to the evaluation group where the additional potential evaluator is associated with one or more of the plurality of functional category designation classifications; or an indication to remove one or more of the potential respective evaluators from the matched group.

In some aspects, the techniques described herein relate to a system, wherein the one or more processors are further configured to: receive one or more changes to a composition of the matched group, wherein the one or more changes are received from the target individual or a manager for the target individual, and wherein the one or more changes include an indication to add an additional potential evaluator who is not associated with any of the functional category designation classifications. 23. A non-transitory computer-readable medium storing computer-program instructions that, when executed by one or more processors, cause the one or more processors to effectuate operations including: access a list of a plurality of candidate data objects to match with a target data object, each candidate data object from among the plurality of candidate data objects being associated with a candidate score representing a strength or affinity to the target data object for matching; classify each candidate data object into a respective functional category designation classification from among a plurality of functional category designation classifications; for each classification from among the plurality of functional category designation classifications: generate a ranked listing of candidate data objects in the classification based on associated candidate scores of each candidate data object in the classification; identify a subset of the ranked listing of candidate data objects based on the ranked listing and a threshold number to limit the subset; evaluate the identified subset against one or more constraints that further limits the number of candidate data objects; and generate an evaluation group for the target data object based on the evaluation.

Various other aspects, features, and advantages will be apparent through the detailed description and the drawings attached hereto. It is also to be understood that both the foregoing general description and the following detailed description are exemplary and not restrictive of the scope of the disclosure.

BRIEF DESCRIPTION OF THE FIGURES

FIG. 3 depicts an illustrative graphical user interface of a platform for implementing systems and methods described herein, in accordance with at least one embodiment;

Figure 1:
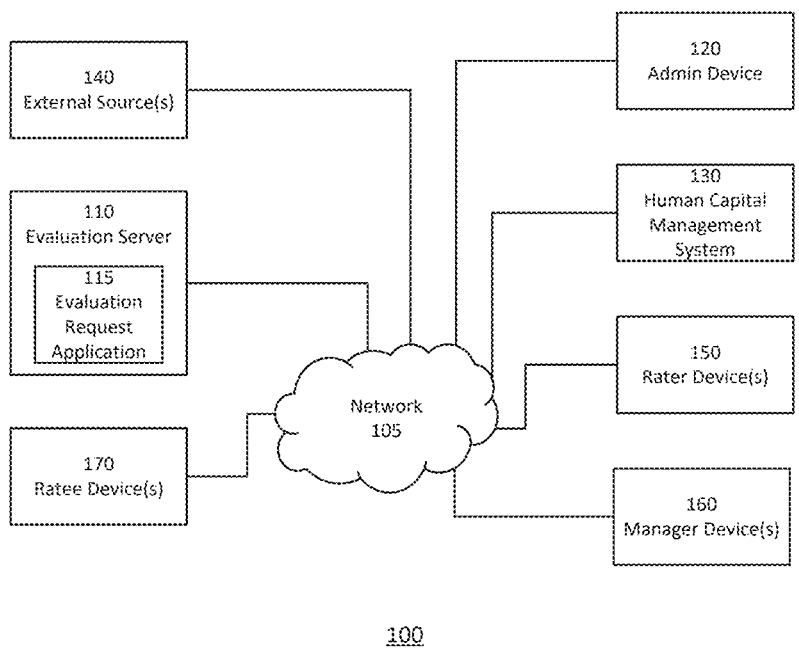
FIG. 1 depicts an illustrative system for providing evaluation requests, in accordance with at least one embodiment.

While the present techniques are susceptible to various modifications and alternative forms, specific embodiments thereof are shown by way of example in the drawings and will herein be described in detail. The drawings may not be to scale. It should be understood, however, that the drawings and detailed description thereto are not intended to limit the present techniques to the particular form disclosed, but to the contrary, the intention is to cover all modifications, equivalents, and alternatives falling within the spirit and scope of the present techniques as defined by the appended claims.

DETAILED DESCRIPTION

In the following description, for the purposes of explanation, numerous specific details are set forth in order to provide a thorough understanding of the various embodiments. It will be appreciated, however, by those having skill in the art, that the embodiments may be practiced without these specific details, or with an equivalent arrangement. In other cases, well-known structures and devices are shown in block diagram form in order to avoid unnecessarily obscuring the embodiments.

To mitigate the problems described herein, the inventors had to both invent solutions and, in some cases just as importantly, recognize problems overlooked (or not yet foreseen) by others in the field of automating the provision of evaluation requests. Indeed, the inventors wish to emphasize the difficulty of recognizing those problems that are nascent and will become much more apparent in the future should trends in industry continue as the inventors expect. Further, because multiple problems are addressed, it should be understood that some embodiments are problem-specific, and not all embodiments address every problem with traditional systems described herein or provide every benefit described herein. That said, improvements that solve various permutations of these problems are described below.

Combinatorial problems present various computational challenges. For example, matching two or more data records from among multiple data records according to an optimization strategy or objective can become computationally expensive. This is because an optimized solution may require a many-to-many comparison that covers all permutations of combinations. As used herein "optimized," "optimization" and similar terminology refers to selecting a match between two or more records based on maximizing a match criteria, such as by selecting a top match in a list of matches sorted by a score that represents suitability between matched records. Furthermore, adding to this complexity, the optimized solution typically aims to maximize a goodness of fit between the matched records according to match fitness criteria. Another issue that can arise is that data records available for matching can change over time. Still further, the optimized solution may be subject to one or more constraints imposed on the system according to particular needs.

To illustrate issues that can arise for combinatorial problems and solutions to these issues, various examples disclosed herein will be described in the context of matching evaluatees (ratees) represented by a target data object to be matched with potential evaluators (raters) represented by candidate data records. Matching ratees with raters may be a combinatorial problem in which multiple candidate data records (each representing a potential rater) is matched against a ratee (represented by a target data object). Because a given organization may have many employees, matching raters and ratees can become computationally expensive because of the many-to-many comparison that covers all permutations of combinations that may be required to identify rater-ratee matches. Furthermore, adding to this complexity, the matches are optimized based on a goodness of fit between the rater and ratee according to levels of affinity between the rater and ratee, which may be observed based on the number of interactions between the rater and ratee. Other types of match criteria may be used instead or in addition to the level of affinity. Still further, data records available for matching can change over time. That is, a given rater may no longer be available to evaluate a ratee. Another complexity is that constraints such as the maximum number of matches in which a given rater is permitted to participate may have to be taken into consideration during combinatorial matching.

Embodiments provide systems and methods that provide evaluation requests for individuals, e.g., in an organization, who require evaluation or feedback. As understood herein, a ratee or evaluatee is an individual being rated or who is otherwise receiving feedback, a rater or evaluator is an individual providing a rating or otherwise providing feedback regarding a ratee, and a manager is a direct supervisor or manager of the ratee.

Embodiments of the systems and methods provided herein enable assessment and development of leaders who demonstrate certain behaviors, including, for example:

A commercial approach no matter the role, so people cannot exist in an insulated world (e.g., a person who thinks their only job is to review the work of others).

Respectful behavior by various lines of business so they cannot ignore functional perspectives (e.g., a salesperson who ignores the downstream impacts of unbookable business).

An organizational thinking that fosters cross-business collaboration (e.g., one line of business praising/critiquing of another line of business and introducing clients to products/opportunities outside of their own product suite or line of business).

Embodiments described may accomplish at least the following:

Evolve from encouraging feedback to requiring feedback (e.g., by setting a minimum of feedback requests that need to be gathered).

Set guardrails around who may provide feedback (e.g., by auto-suggesting raters).

Ensure feedback is solicited from people in lines of business and corporate functions other than the ratee's direct line of business (e.g., by setting rules that a first defined set of the feedback be business-to-business related, a second defined set be business-to-function related, a third defined set be own business/function, etc.).

Provide a systematic approach that removes some manager and managee (e.g., employee) flexibility (e.g., allowing to change raters but requirement to stay within a predefined percentage), applies certain rules (e.g., maximum number of feedback requests someone can receive), and is as automated or semi-automated (e.g., auto-selection of raters).

Enable delivery of a feedback form that is easy to respond to (e.g., utilizes radio buttons, limits free comments to one field with a maximum number of characters, etc.)

Enable managers to utilize the feedback their employees receive for development-related and performance-related discussions (e.g., via auto-generated summary reports).

The need for improved systems and methods for identifying evaluators (raters) to be paired with evaluatees (ratees) may be evident in various contexts, including, for example, in employee performance evaluations, customer feedback, peer reviews, or in any scenario involving participants in an evaluation process. Current systems face several technical problems that hinder their effectiveness.

First, the auto-suggestion of raters based on past interactions may pose a significant issue. Current algorithms are often simplistic and may not accurately reflect the quality and depth of the relationship between the ratee and potential raters. As a result, feedback may be suboptimal, as suggested raters may lack the necessary knowledge to provide meaningful evaluations.

Second, the grouping of auto-suggested raters into categories may involve complex technical challenges. These difficulties stem from the need to process vast amounts of data, develop sophisticated algorithms to analyze relationships and feedback quality, ensure data privacy and security, handle scalability as organizations grow, adapt to dynamic feedback dynamics, allow for user customization, and maintain data quality and consistency.

Furthermore, auto-selecting raters after a period of inaction by the ratee or their manager may be a flawed approach, as it may assume that a lack of action implies approval or consent, ignoring the possibility that the ratee may be waiting for the right moment or appropriate rater. This may result in unrepresentative evaluations and may not align with the ratee's preferences or needs for feedback.

In addition to these issues, the selection of the audience for feedback cycles through technical controls, rules, and filters may be overly restrictive, potentially excluding valuable perspectives and introducing bias. Meanwhile, fully automating the feedback process, while streamlining it, may miss the nuances that humans may provide and be prone to errors. Lastly, integrating a new solution into existing applications may aid in user adoption but may be challenging if it disrupts the user experience and workflow.

However, current systems and methods fail to address the technical problems described above, e.g., the auto-suggestion of raters, their categorization into certain groups, and the auto-selection of raters after a certain time period of inaction from the ratee.

These and other aspects of the systems and methods for providing evaluation requests will be further described in detail herein.

Those with skill in the art will appreciate that inventive concepts described herein may work with various system configurations. In addition, various embodiments of this disclosure may be made in hardware, firmware, software, or any suitable combination thereof. Aspects of this disclosure may also be implemented as instructions stored on a machine-readable medium, which may be read and executed by one or more processors. A machine-readable medium may include any mechanism for storing or transmitting information in a form readable by a machine (e.g., a computing device, or a signal transmission medium), and may include a machine-readable transmission medium or a machine-readable storage medium. For example, a machine-readable storage medium may include read only memory, random access memory, magnetic disk storage media, optical storage media, flash memory devices, and others. Further, firmware, software, routines, or instructions may be described herein in terms of specific exemplary embodiments that may perform certain actions. However, it will be apparent that such descriptions are merely for convenience and that such actions in fact result from computing devices, processors, controllers, or other devices executing the firmware, software, routines, or instructions. These and other features are described in detail herein with reference to the foregoing figures.

FIG. 1 depicts an illustrative system for providing evaluation requests, in accordance with at least one embodiment.

FIG. 1 illustrates a functional block diagram of an embodiment of an evaluation coordination system 100 within which at least some of the disclosed techniques may be implemented. The evaluation coordination system 100 may be established to permit the automated or semi-automated providing of various evaluation requests to numerous raters via network 105.

In some embodiments, various devices and applications described herein may be configured to communicate via network 105. In some embodiments, computing devices and servers described herein may communicate over network 105, which, in various embodiments, may be any of a diverse range of networks, each tailored to specific needs: Local Area Networks (LANs) linking devices within a confined area such as a home or office; Wide Area Networks (WANs) connecting devices across larger geographical areas, such as cities or countries; Metropolitan Area Networks (MANs) serving as intermediaries, connecting LANs within a city or region; wireless networks; cellular networks; Storage Area Networks (SANs); and/or Virtual Private Networks (VPNs) secure data over public networks. In some embodiments, network 105 may be any combination of the above, which may be a combination of private and public networks.

In some embodiments, each of the elements of evaluation coordination system 100 may be or may include applications executed on respective computing systems, though this need not always be the case. In some examples, one or more of the applications may be executed on a single computing system (which is not to suggest that such a computing system may not include multiple computing devices or nodes, or that each computing device or node need be co-located; indeed, a computing system including multiple servers that house multiple computing devices may be operated by a single entity and the multiple servers may be distributed, e.g., geographically). For example, in some embodiments, an entity may execute an evaluation request application on a server or other computing system, e.g., evaluation server 110. Moreover, in some examples, the entity may also provide users access to an evaluation application on various user devices (e.g., devices 120, 150, 160, and/or 170, described herein), which may be a web-based application hosted by a computing system managed by or provisioned by the entity, or which communicates with such a computing system via an application programming interface (API). Accordingly, one or more of the devices/systems/elements depicted herein may communicate with one another via messages transmitted over network 105, such as the Internet and/or various other local area networks. For example, one or more applications may communicate via messages transmitted over network 105.

In some example embodiments, evaluation server 110 may include, host, or otherwise execute an evaluation request application 115. In some embodiments, evaluation request application 115 may be a user facing application with which a user interfaces to access various aspects of the systems and methods described herein. For example, an administrator of an entity or organization may use an admin device 120 to access features of evaluation request application 115 described herein, e.g., to initiate and execute a feedback cycle, as described herein. Likewise, various raters, managers, and ratees may access, interact with, and/or communicate via evaluation request application 115 from rater devices 150, manager devices 160, and ratee devices 170, respectively, as described herein. While only one instance of an evaluation request application 115 is shown, embodiments of the evaluation coordination system 100 may include tens, hundreds, thousands, or more such applications accessed by different users on or from their respective computing systems. The evaluation request application 115 and users of the system (e.g., administrators, raters, managers, ratees, etc.) may be isolated from accessing some or all of the features and/or information associated with the evaluation request application 115, except as described herein.

In some embodiments, evaluation request application 115 may include a user interface through which a user may interact with evaluation coordination system 100 via various user devices, e.g., devices 120, 150, 160, and 170. For example, an administrator may desire to initiate a feedback cycle. According to embodiments, the administrator, using admin device 120 may interact with a user interface of evaluation request application 115, accessing only the data which the administrator is permitted to view, which in turn may send a request or instruction, via an application programming interface (API) associated with evaluation server 110, to facilitate an evaluation request between one rater and one ratee, e.g., with approval of a manager, on evaluation server 110.

For example, an administrator may be provided a screen in a graphical user interface (GUI) which may be utilized to set up the feedback cycles. In some embodiments, these cycles may be semi or fully customizable and, in some embodiments, multiple cycles may run concurrently. In some embodiments, evaluation request application 115 may facilitate the following administrative processes of setting up a feedback cycle, e.g., which may include one or more of the following:
  a. Setting of start and/or end dates for: an overall feedback cycle, rater selection phase, manager review phase, rater feedback phase, and results release phase. As explained in detail herein, these phases may correspond to windows of time during which input may be received by evaluation request application 115 from each of devices 150, 160, and 170, as well as a defined time or timeframe when received feedback is to be made available to ratees. It should be noted, of course, that certain phases may have or require no end date. For example, the phase during which feedback may be reviewed by a ratee may continue as long as the ratee is associated with the entity/organization. Likewise, in some embodiments, phases may be reopened, e.g., up the implementation of changes by a subsequent user. For example, projection by a manager of a threshold number of potential evaluators suggested by the ratee may trigger the reopening of a limited additional time frame during which the ratee may make additional suggestions. Similarly, the unavailability of a threshold number of potential evaluators may trigger the reopening of limited additional time frames for managers and/or ratees to make additional changes, as explained herein.
  b. Defining of rater and ratee populations or groups, e.g., by setting filters, providing guidelines for appropriate raters, and/or setting constraints on one or more available data fields (e.g., geography, tenure, corporate title, business unit, known personal relationships or connections, etc.).
  c. Creating a feedback form, e.g., by selecting existing questions from a template or adding new questions, and grouping questions into categories of questions.
  d. Setting limits for one or more thresholds, including, for example, how many raters may be displayed per group, how many raters may be selected per group, how many feedback requests a rater may receive, how many words may be entered into an open text field of the feedback form, how many questions may be left unanswered, etc.

As described in further detail herein, once the admin process is complete, embodiments may utilize relevancy scores (e.g., a score indicative of a volume of relevant interactions between a rater and a ratee) for each rater-ratee pairing (e.g., based on interactions they have had with each other via electronic means of communication over a defined period of time) to derive a numerical sort order or ranking that is assigned to each rater (potential evaluator) with respect to the ratee (potential evaluatee) with whom they interacted. In some embodiments, this may be a linear process such that a higher relevance score results in a higher rank in the sort order. In other embodiments, various algorithms may be implemented to determine meaningful relationships, irrespective of linearity, e.g., based on other factors, as described herein.

Additionally, embodiments may utilize data regarding raters and ratees, as well associated relevancy scores of the raters, to categorize raters into certain groups or functional category designations. The automated process may be pointed to any data field that was part of the initial upload described herein and/or any number of groups containing any number of raters may be generated and/or displayed. In some embodiments, ratees may be provided a first opportunity to review and/or modify the groups, to create an initial slate of potential reviewers. As described herein, such initial slate may be a starting point for generation of a final evaluation group to which evaluation requests may be sent.

As described herein, once a request is sent, in some embodiments, a rater, using rater device 150, may access their account information or information and questions about ratees specified by the admin on the evaluation request application 115. In certain embodiments, a rater may not be provided information about any other ratee for which an evaluation request has not been sent to that rater. Similarly, a manager, e.g., using manager device 160, may access their account information or information about raters who have been requested to provide evaluations of ratees under the manager's direct responsibility on the evaluation request application 115. In certain embodiments, a manager may not be provided information about any other ratee not under the manager's direct management. In some embodiments, a ratee, e.g., ratee device 170, may access their account information or information about evaluations they have received on the evaluation request application 115, but not information about any other ratees or raters who have not provided the ratee with an evaluation.

In some example embodiments, an evaluation request application 115 may receive or otherwise access information about administrators, raters, managers, and/or ratees, from a human capital management system 130 and/or from external sources 140, to determine who may be granted access to what information, to identify and determine various relationships and/or interactions between the various user devices (120, 150, 160, 170), etc. For example, in some embodiments, an export file from human capital management system 130 containing information about at least some employees in an organization or entity (e.g., name, email address, start date, business unit, corporate title, etc.) may be imported into a central repository/database (not shown) or otherwise accessed by evaluation request application 115 (e.g., as is or enhanced with additional datapoints pulled in from other sources, e.g., external source(s) 140, such as social media accounts, public records, other organizational databases and/or communication recourses, etc.).

In some example embodiments, evaluation request application 115 may be an internally facing application by which agents, employers, employees, staff, owners, contractors, consultants, etc., and/or any participant in an evaluation process, e.g., initiated by an entity or group, may facilitate evaluations among participants. While only one instance of an evaluation request application 115 is shown, embodiments of evaluation coordination system 100 may permit participants from multiple divisions or groups of an entity implementing evaluation request application 115 to access respective instances of such an application from their respective computing systems (e.g., respective user devices 120, 150, 160, and/or 170).

In some embodiments, evaluation coordination system 100 may include one or more external source(s) 140. As understood herein, external source(s) 140 may be a collection of one or more applications and/or systems which execute or otherwise provide functions related to interactions, communications, associations, coordinations, affiliations, etc., between various individuals in an organization or entity implementing evaluation coordination system 100. It should be noted that, in some embodiments, external source(s) 140 may be external to evaluation server 110 and human capital management system 130, and yet may be internal to the organization or entity (e.g., separate accounting systems, human resources systems, payment systems, etc.), or may be external to the organization or entity (e.g., third-party resources, companies, databases, etc.).

Figure 2:
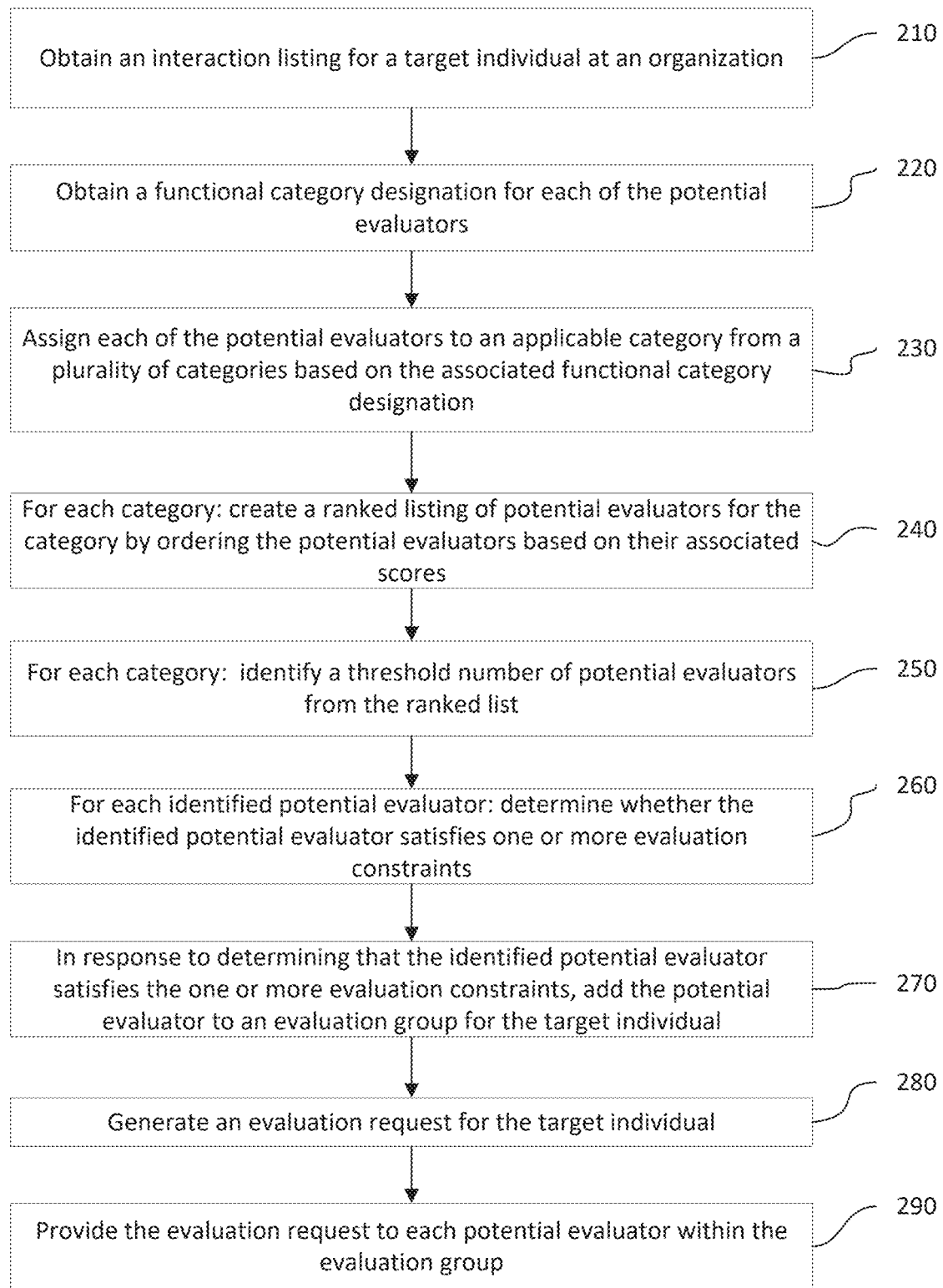
FIG. 2 depicts an example method for providing evaluation requests, in accordance with at least one embodiment.

These and other features of evaluation coordination system 100 will be further understood with reference to the evaluation request method 200 of FIG. 2, herein.

FIG. 2 depicts an example method for providing evaluation requests, in accordance with at least one embodiment. In various embodiments, method 200 may be implemented by evaluation coordination system 100, executing code in one or more processors therein. For example, in some embodiments, method 200 may be performed on a computer (e.g., computer system 1000 of FIG. 5) having one or more processors (e.g., processor(s) 1010 of FIG. 5) and memory (e.g., system memory 1020 of FIG. 5), and one or more code sets, applications, programs, modules, and/or other software stored in the memory and executing in or executed by one or more of the processor(s).

Method 200 begins at step 210 when a processor (e.g., of evaluation server 110) obtains an interaction listing for a target individual at an organization. For example, in some embodiments, as described above, a user, e.g., an administrator, supervisor, or other user with authority to initiate a feedback cycle, may access evaluation request application 115, e.g., via a computing device such as admin device 120, to initiate a feedback cycle. As understood herein, a feedback cycle may be any systematic process in which information or input is provided, received, and/or acted upon to make adjustments, improvements, or changes in a particular system or situation. In some embodiments, a feedback cycle may involve the continuous or asynchronous flow feedback information, often in an iterative manner, where the output or results of ratees (e.g., employees, subordinates, peers, or even supervisors, etc.) may be assessed and used to modify and influence subsequent actions or decisions with respect to the ratee. Feedback cycles are common in various fields and environments, and they may be helpful in maintaining and optimizing the performance of both individuals and organizations/entities over time.

In some embodiments, evaluation server 110 may receive, retrieve, or otherwise obtain information regarding various individuals within or otherwise associated with an entity or organization. For example, in some embodiments, evaluation server 110 may obtain information, for example, an export file, from a source at which such data has been aggregated, e.g., human capital management system 130. In some embodiments, the data may contain information about a group of individual participants, e.g., at least some employees in an organization or entity (e.g., name, email address, start date, business unit, corporate title, etc.). Such information may be imported from one or various sources and aggregated into a central repository/database or otherwise accessed (e.g., remotely via APIs, etc.) by evaluation request application 115. In various embodiments, such data may also include personally identifiable information (PII) and/or information regarding interactions between individuals.

In some embodiments, interaction data may encompass various data types or communication types within an entity or organization, including, for example, verbal and written communication like emails, instant messages, and in-person conversations (e.g., which have been digitally recorded or memorialized). It may also include collaboration on shared documents, projects, and presentations, as well as the exchange of feedback before, during, or after meetings, and past performance evaluations. In some embodiments, interaction data may include any interaction that has a digital footprint within or accessible to an organization as data. For example, in some embodiments, interaction data may encompass various data types, such as email exchanges, instant messaging conversations, comments on shared digital documents or projects, feedback submitted through digital platforms, virtual meetings, video conferencing, and social media interactions among colleagues.

In some embodiments, e.g., once information regarding individuals and their various interactions have been obtained by evaluation request application 115, evaluation request application 115 may obtain an interaction listing for a target individual, e.g., an individual at an organization or entity. In some embodiments, the interaction listing may include one or more, e.g., a plurality of, potential evaluators for the target individual. In some embodiments, each potential evaluator may be associated with a score representing a volume of interactions between the given potential evaluator and the given target individual, e.g., over a defined period of time.

In various embodiments, different methods and/or algorithms may be implemented to determine a score representing a volume of interactions between two individuals, e.g., a score that encapsulates the nature and strength of their relationship. Various embodiments include, for example, a frequency-based score, utilizing methods such as graph algorithms (e.g., counting the number of connections), association rule mining (e.g., an a priori algorithm for discovering associations in interactions), social and/or node network analysis (e.g., centrality measures for assessing the influence of each individual or node within a network), etc. These and other algorithms may help quantify and evaluate the extent of connections between individuals. In some embodiments, incorporating recency into the score may provide a temporal dimension, with techniques such as time series analysis helping to assign more weight to recent interactions. Additionally, in some embodiments, inclusion of a weighted score system, drawing from approaches like machine learning models (e.g., neural networks) or content-based filtering, may allow for a more nuanced evaluation by considering different interaction types and their significance. In various embodiments, the type of scoring method may be driven by the specific context, the nature of the relationship, and the analytical objectives, ensuring that the score effectively represents the interactions between the two individuals.

In some embodiments, the score may gauge and/or identify the volume of interactions or correlations within a group of individuals or data points. In some embodiments, a range of algorithms and techniques may be applied to generate scores and rank these entities accordingly. For example, centrality analysis, which encompasses methods like degree centrality, betweenness centrality, and eigenvector centrality, may help quantify the influence or correlation of individuals within a network, with higher centrality scores indicating stronger connections. Community detection algorithms, like Louvain modularity and Girvan-Newman algorithm, identify subgroups of highly interconnected individuals, revealing the most correlated clusters. In some embodiments, recommendation systems, such as collaborative filtering, may highlight individuals highly correlated with specific items or topics, while Principal Component Analysis (PCA) may pinpoint those with notable correlations across multiple dimensions. Machine learning models, when trained to predict interactions, may offer feature importance scores to identify crucial individuals in predicting relationships.

In some embodiments, statistical correlation measures like Pearson and Spearman may be implemented to capture the strength and direction of relationships, ranking individuals with the highest correlation coefficients as having the strongest connections. In some embodiments, clustering algorithms may group individuals based on their similarity in interactions, while social network analysis (SNA) metrics evaluate connectivity. In some embodiments, frequent pattern mining techniques may be implemented to unveil recurring interaction patterns, in which individuals participating in these patterns tend to have high correlation scores. By applying these algorithms and ranking the outcomes, in some embodiments, various systems and methods described herein may identify and assess the individuals or data points with the most robust correlations, and in some embodiments, each potential evaluator may be associated with a score representing a volume of interactions between the given potential evaluator and the given target individual, e.g., over a defined period of time.

At step 220, in some embodiments, the processor may obtain a functional category designation for each of the potential evaluators. As understood herein, a functional category designation reflects a designation of an individual within a specific category based on one or more defined features and/or characteristics of the given category (and/or of individuals in the given category). In some embodiments, obtaining a functional category designation from each of the potential evaluators may include obtaining, for each potential evaluator, an indication of whether the potential evaluator is a member of one or more of the following example groups: an organizational group to which the target individual belongs; an organizational group to which the target individual does not belong; and/or association/identification with an enterprise organizational group. Of course, in other embodiments, additional and/or alternative groups may be included.

In some embodiments, the number and/or types of categories to which potential evaluators may be assigned may vary, e.g., based on a ratee's role, responsibilities, title, designation, etc., or any other feature associated with the ratee. In some embodiments, such features may relate to one or more potential evaluators (e.g., a designation as a manager may indicate a relation to one or more individuals being managed by and/or reporting to the manager). In some embodiments, such features may change over time and, accordingly, the number and/or types of categories may fluctuate and/or change of time as well. In some embodiments, features associated with one or both of the ratee and the potential evaluators may be considered in determining within which categories potential evaluators are assigned.

For example, in some embodiments, ratees may find that one or more individuals who are expected to be potential evaluators, or should otherwise be available as evaluators, do not appear as options for selection as evaluators. Accordingly, in some embodiments, one or more additional and/or alternative groups of potential evaluators may be provided, in order to broaden the pool of potential evaluators for a given ratee. For example, managers who are being rated may be provided with a fourth category—the same three outlined above, along with a separate category for their direct reports (e.g., people who report to the manager, regardless of whether or not they are in one of the other three categories). Such an additional example category may avoid managers being recommended only raters who are in their hierarchy. In some embodiments, as explained herein, the number of groups used in determining a functional category designation may impact or correspond to the number of potential evaluators which may be made available to a ratee for selection. For example, rather than being provided with nine (9) potential evaluators, managers may be allowed twelve (12) potential evaluators, accounting for the extra category (e.g., 3 from each category).

At step 230, in some embodiments, the processor may assign each of the potential evaluators to an applicable category from a plurality of categories based on the associated functional category designation. In some embodiments, such categories may enable evaluation request application 115 to associate or identify similar or like individuals among potential evaluators, which may narrow the field of potential evaluators (i.e., potential raters) for a given ratee.

At step 240, in some embodiments, the processor may, for each category, create a ranked listing of potential evaluators for the category, e.g., by ordering the potential evaluators based on their associated scores. For example, in some embodiments, individuals within a given category may be ranked based on their assigned interaction volume scores. These individual scores may serve as a representation of the strength and extent of their interactions with a ratee within the group. In some embodiments, the potential evaluators may then be ranked, e.g., in ascending or descending order, based on their associated scores. In some embodiments, the individual with the highest score may take a top rank, while subsequent individuals in the group may be ranked accordingly.

In some embodiments, individual scores may be aggregated to create a single group-level interaction score, offering an overall measure of interactions or correlations within the group as compared with other groups. In some embodiments, the groups may then be ranked, e.g., in ascending or descending order, based on their aggregated interaction scores. In some embodiments, the group with the highest cumulative score may take a top rank, while subsequent groups may be ranked accordingly. This ranking system may provide a hierarchical view of which groups exhibit the most substantial interactions or correlations with the given ratee within the dataset, and may assist in the prioritization or further analysis of specific groups with strong interaction patterns. In some embodiments, both the ranking within a given group as well as the overall ranking of the group may both be considered in determining an overall ranking of potential evaluators. For example, a potential evaluator in a lower ranked group may nevertheless be a better candidate than another potential evaluator in a higher ranked group based on that individual's high ranking with the lower ranked group. Conversely, a potential evaluator in a higher ranked group may nevertheless be a worse candidate than another potential evaluator in a lower ranked group based on that individual's lower ranking with the higher ranked group. In some embodiments, an overall list or ranking may be generated which accounts for these and/or other relevant factors.

At step 250, in some embodiments, the processor may, for each category, identify a threshold number of potential evaluators from the ranked list. In some embodiments, such identification may be based on defined rules or thresholds, for example, a minimum or maximum number of candidates from each group. In some embodiments, groups which fall below a given threshold may be combined with other groups and/or groups which exceed a given threshold may be split, e.g., based on further defined rules and/or characteristics. In some embodiments, rather than automatically combining groups that fall below a threshold, a ratee may be provided an option to manually select one or more potential evaluators from one or more other groups that exceed the threshold. For example, some ratees may have limited cross-functional interactions. Accordingly, if a ratee does not have a threshold number of rater suggestions for one or more of their categories, in some embodiments, the processor may be configured to enable the ratee to choose additional raters from their other categories. For example, if a ratee who is a manager has three (3) raters for Category A, three (3) raters for Category B, and three (3) raters for Category D, but only one (1) rater for Category C, in some embodiments, the system may allow the ratee to choose two (2) additional raters from one or more of Categories A, B, and D. Such configuration may help in providing a minimum threshold number of required raters per ratee, and/or may provide the ratee opportunities for feedback from additional relevant potential evaluators. In some embodiments, the threshold number of potential evaluators may be based on the top-scoring potential evaluators, such as the top N potential evaluators, where the threshold number is N. In particular embodiments, N is 100, 50, or other number. Alternatively, or additionally, there are other ways to define the threshold or rules. For example, a threshold number or rule may be defined as the potential evaluators being in the top X percentile of scores, where X is defined as a percentile such as twenty.

At step 260, in some embodiments, the processor may, for each identified potential evaluator, determine whether the identified potential evaluator satisfies one or more evaluation constraints. An evaluation constraint, as understood herein, may refer to a data point, detail, or item of information regarding the potential evaluator and/or interaction data associated with the potential evaluator and the target individual (e.g., the ratee) which, notwithstanding the potential evaluator's rank, impacts (e.g., positively or negatively) the ability of the system to assign the potential evaluator to the ratee. In some embodiments, an evaluation constraint may be or may relate to, for example, a number of evaluations already assigned to the potential evaluator, a number of previous prior evaluations historically received by the ratee from the potential evaluator, a non-organizational connection, relationship, or interaction between the potential evaluator and the ratee (e.g., a familial or legal relationship, a legal dispute, a shared community, etc.). For example, notwithstanding a potential evaluator's high-ranking, status as a relative of the ratee may impact whether and/or to what extent the potential evaluator may be assigned to the ratee. By way of another example, notwithstanding an evaluator's low-ranking, a new assignment to the same team may warrant assignment as an evaluator.

In some embodiments, determining whether the identified potential evaluator satisfies one or more evaluation constraints may include, for example, determining whether one or more of the following example criteria is satisfied: the identified potential evaluator has already been selected for the target individual (e.g., during a previous cycle, during consecutive cycles, etc.); the identified potential evaluator has been selected to evaluate at least a threshold number of total individuals (e.g., 10 or 20 other individuals) during an evaluation cycle; an organization rank for the identified potential evaluator does not exceed a threshold value (e.g., the identified potential evaluator lacks a requisite title, tenure, etc.); the organization rank for the identified potential evaluator exceeds a second threshold value (e.g., the identified potential evaluator is too senior for the ratee); the potential evaluator is located in a certain jurisdiction (e.g., the identified potential evaluator is located in a different jurisdiction than the ratee); or the potential evaluator has not worked for the organization for more than a threshold period of time (e.g., in total, at a particular position, in a particular location, etc.). Additional and/or alternate criteria may be used within the scope of this disclosure.

At step 270, in some embodiments, e.g., in response to determining that the identified potential evaluator satisfies the one or more evaluation constraints, the processor may add the potential evaluator to an evaluation group for the target individual (e.g., the ratee). In some embodiments, each ratee identified, e.g., in an organization or entity, may be accorded or assigned to its own evaluation group. In some embodiments, potential evaluators may be assigned to multiple evaluation groups, each associated with a different target individual. In some embodiments, a ratee may be assigned multiple evaluation groups, each correlating to different tasks, assignments, teams, goals, etc., with which the ratee is associated. For example, a ratee may be associated with a leadership evaluation group as well as a performance evaluation group, which, in an example embodiment, may be considered and evaluated separately by the entity.

In some embodiments, evaluation request application 115 may receive one or more changes to a composition of the evaluation group from the target individual. In some embodiments, upon initial compilation of a given evaluation group for a given ratee, one or more individuals may be provided an opportunity to confirm and/or modify the evaluation group. For example, in some embodiments, a ratee may receive an initial indication of the composition of the evaluation group. In response, one or more changes to the composition of the evaluation group may be received by evaluation request application 115, including, for example, an indication to add an additional potential evaluator to the evaluation group. In some embodiments, the request may only be accepted where the additional potential evaluator is associated with one or more of the plurality of categories, e.g., is therefore suitable as a potential evaluator.

Additionally or alternatively, the one or more changes to the composition of the evaluation group received by evaluation request application 115 may include an indication to remove one or more of the potential evaluators from the evaluation group. It should be noted that such additions and/or removals requested by the target individual may not reflect an incorrect initial grouping. For example, in some embodiments, changes may be warranted based on changing circumstances or information not readily available to the system, e.g., interactions that are not formally tracked such as mentorship by an individual that is not in the ratee's hierarchy, etc. In some embodiments, the initial slate of potential evaluators provided by or approved by the ratee may represent a first or initial evaluation group which may then be further modified by other users of evaluation coordination system 100.

In some embodiments, upon submitting the selected slate, evaluation request application 115 may execute an automated process which may check whether or not selected potential evaluators has already received a defined maximum number of feedback requests, e.g., from other ratees, during the administrative process. If a rater is at the maximum, the evaluation request application 115 may be configured to alert the ratee (e.g., via email or other notification) that the given rater is not available to evaluate the ratee. In some embodiments, evaluation request application 115 may refresh the list of suggested raters (e.g., exclude the maxed-out rater and include the next available rater as per the sort order described herein). In some embodiments, a request may be sent to the ratee asking the ratee to make an alternative selection.

In some embodiments, rules defining how often a rater appears as a suggestion may be set, e.g., during the administrative process. For example, it may be stipulated that any rater who provided feedback to a certain ratee may not appear as a suggestion again within a defined period, e.g., the following 12-months of when the feedback was provided.

In some embodiments, ratees may be provided a defined amount of time (e.g., a two-week period), as defined during the administrative process, to complete and submit their selections. Accordingly, in some embodiments, should no action be taken, e.g., no change requests are received, an auto-process may select an initial rater slate from the evaluation group (or may provide the entire group to others, as described herein.

In some embodiments, in addition to and/or in the alternative to the ratee, the evaluation group may be sent to one or more managers (e.g., manager device(s) 160) of the ratee for confirmation. In response, in some embodiments, evaluation request application 115 may receive one or more changes to the composition of the evaluation group from a manager (or managers) for the target individual. For example, a manager may determine that a pairing of the potential evaluator and the ratee is unwarranted, inappropriate, or should otherwise not commence for one or more reasons which may not have triggered an evaluation constraint to prevent the addition of the potential evaluator to the evaluation group. Additionally or alternatively, a manager may determine that the a potential evaluator was erroneously excluded from the evaluation group.

In such case, in some embodiments, the manager may be given the opportunity to make one or more changes, via evaluation request application 115, to the composition of the evaluation group. In some embodiments, the request may only be accepted where the additional potential evaluator is associated with one or more of the plurality of categories, e.g., is therefore suitable as a potential evaluator. In some embodiments, receiving one or more changes to the composition of the evaluation group may include, for example, receiving, by evaluation request application 115, an indication to add an additional potential evaluator to the evaluation group, e.g., where the additional potential evaluator is associated with one or more of the plurality of categories. In some embodiments, receiving one or more changes to the composition of the evaluation group may include, for example, receiving, by evaluation request application 115, an indication to remove one or more of the potential evaluators from the evaluation group. It should be noted that such additions and/or removals may not reflect an incorrect initial grouping. For example, in some embodiments, changes may be warranted based on changing circumstances or information not readily available to the system. In some embodiments, managers may receive indications reflecting changes made by ratees, which may be used in considering modifications to the evaluation group.

While the manager may be empowered to change a rater's initial slate of potential evaluators, in some embodiments, the manager may only be provided the ability to choose from the auto-suggested raters per group. For example, if there are six suggested raters in an initial evaluation group and the ratee chose the top three ranked potential evaluators (e.g., #1, #2, and #3), in some embodiments, the manager may then change the selection, to, e.g., #1, #4 and #5, but could not choose an evaluator in a seventh slot. For example, in some embodiments, only the first six potential evaluators may be provided for display. As with the ratee selections, in some embodiments, upon approving a slate, evaluation request application 115 may initiate an auto-process which may check if any rater has already received a maximum predefined number of feedback requests as defined during the administrative process. If a rater is at the maximum, the evaluation request application 115 may be configured to alert the manager (e.g., via email or other notification) that the given rater is not available to evaluate the ratee. In some embodiments, evaluation request application 115 may refresh the list of suggested raters (e.g., exclude the maxed-out rater and include the next available rater as per the sort order described herein). In some embodiments, a request may be sent to the manager asking the manager to make an alternative selection.

In some embodiments, evaluation request application 115 may receive one or more changes to a composition of the evaluation group from the target individual and/or from one or more managers in which the additional potential evaluator is not associated with any of the categories. In some embodiments, such changes may be denied outright. In some embodiments, such changes may be subject to further evaluation, e.g., by an administrator or other authorized manager who may be authorized to override the denial and allow the change to be implemented by evaluation request application 115.

At step 280, in some embodiments, the processor may generate an evaluation request for the target individual, e.g., based on the evaluation group or groups of the ratee. In some embodiments, generating an evaluation request for the target individual may include automatically generating, e.g., by evaluation request application 115, the evaluation request. In some embodiments, evaluation request forms for an evaluator tasked with evaluating a ratee may be generated through several methods, each tailored to specific contexts and requirements. In some embodiments, an evaluation request may be in the form of a communication, e.g., an e-mail, requesting that the potential evaluator access evaluation request application 115 and complete a prepared evaluation. In some embodiments, a digital version of a form may be delivered as an attachment or as a link to a cloud-based form or document. In some embodiments, the substance of an evaluation request may involve automated data-driven generation of questions, e.g., related to the ratee and/or the ratee's performance, progress, growth, challenges, successes, issues, errors, skills, interactions, etc. In some embodiments, each evaluation request, or various categories of evaluation requests, may be drafted or otherwise predefined, e.g., by an administrator or manager during an initial process. In some embodiments, an evaluation request may be generated for a ratee based on an account of the ratee, a summary report (e.g., auto-generated) of the ratee, e.g., including a list of matters, clients, individuals, etc., with which the ratee was involved, and/or any other relevant previously received data regarding the ratee.

At step 290, in some embodiments, the processor may provide the evaluation request to each potential evaluator within the evaluation group or groups of the ratee. In some embodiments, the processor may provide the evaluation request to each potential evaluator within the evaluation group by automatically providing each potential evaluator with the evaluation request, e.g., via e-mail or other digital communication (instant message, SMS text link, automated call, etc. In some embodiments, upon receipt of an evaluation request by the potential evaluator, the potential evaluator may accept the request, e.g., by sending a reply or other digital indicator of acceptance.

It should be noted that, in some embodiments, changes to the evaluation group or groups of the ratee may be implemented even after the processor has provided the evaluation request to each potential evaluator within the evaluation group. For example, if additional evaluators are added to the evaluation group after requests are sent, those evaluators may also receive an evaluation request. Conversely, in some embodiments, a manager or the target individual may request the removal of a potential evaluator after the evaluation request has been sent but before it has been accepted and/or completed. In such embodiments, a retraction request may be sent (e.g., indicating the evaluation request has been canceled) and/or evaluation request application 115 may be configured to make the evaluation request unavailable at that time, e.g., by disabling access to the evaluation request.

Furthermore, in some embodiments, upon receipt of an evaluation request, a potential evaluator may request a change to the composition of the evaluation group. For example, evaluation request application 115 may receive an indication from the potential evaluator rejecting the evaluation request or otherwise indicating that it will not be completed by the potential evaluator, e.g., due to unforeseen circumstances (evaluator is unavailable, etc.), an unforeseen conflict, or other consideration. For example, upon logging into evaluation request application 115, the rater may be presented with all feedback requests that have been received. The rater may be provided the option to decline the request or provide feedback. In some embodiments, the decision to decline a request may be reversed until the end of the rater feedback phase end date set during the administrative process described herein.

In some embodiments, should the rater decide to provide feedback, the rater may be presented with a feedback form for each ratee, as described herein. The form may contain a set of questions, e.g., the set of questions defined during the administrative process described herein. In some embodiments, the rater may further be provided with other visual indicators, such as, for example, a scale or a set of radial buttons with associated numerical values to rate the ratee for each question. In some embodiments, the rater may be given the option whether to answer a question or skip it. In other embodiments, an answer may be required for each question. In some embodiments, the rater may also be provided the option to leave written comments, e.g., via text boxes with a maximum word count defined during the administrative process described herein.

In some embodiments, the feedback form may alert a rater if questions have been unanswered and/or may provide an indication of the average rating they assigned to a ratee. In some embodiments, the feedback form may be configured to autosave at certain intervals, e.g., upon the completion of a question, section, page, etc.

In some embodiments, once the feedback form has been completed, an automated process may be configured to scan the open text comments for any keywords that may be set for tracking, e.g., utilizing a dictionary of sensitive words. Should a keyword be detected, evaluation request application 115 may send an automated notification to a rater, alerting them of the issue, e.g., sensitive comment or inappropriate term used. The reviewer may then determine if further action/escalation is required.

In some embodiments, automated system-generated reminders may be sent to any user who has an open action item at any stage. The interval of these reminders may be set by an administrator during the administrative process. For example, a ratee who has not chosen an initial slate may be reminded to do so prior to the end of the timeframe available to make changes to the evaluation group. A manager who has not made any changes to an initial slate may be reminded to do so prior to the end of the timeframe available to make changes to the evaluation group. A rater who has not rejected an evaluation request may be reminded to do so prior to the end of the timeframe available to reject a request. In some embodiments, if any stage in which an action is requested, e.g., the changing of raters, the provision of feedback, etc., is not completed by a given user (e.g., a rater, a ratee, and/or a manager) by the end of a phase, automated system-generated actions may be executed on behalf of the user and/or on behalf of an administrator. For example, if a manager has not provided any changes to an evaluation group by the end of the timeframe allotted for such changes, in some embodiments, the system may automatically advance the evaluation process to the next step, and/or may automatically alert an administrator of the issue. If a rater has not completed an evaluation within a defined timeframe, an alternate evaluator may be requested.

In some embodiments, feedback scores may be calculated as an average of the ratings received from various raters. In some embodiments, a feedback score may only be visible if feedback has been received from a minimum number of raters. In some embodiments, evaluation request application 115 may provide statistics, graphs, and or other visuals, which may indicate how a score has changed compared to past feedback, e.g., the last feedback cycle the ratee participated in. In some embodiments, comments received may be shared verbatim, while in other embodiments, the system may be configured to automatically modify, e.g., summarize or quantify, the feedback. In some embodiments, historical feedback cycles may be selected to show the respective scores and comments.

Figure 3:
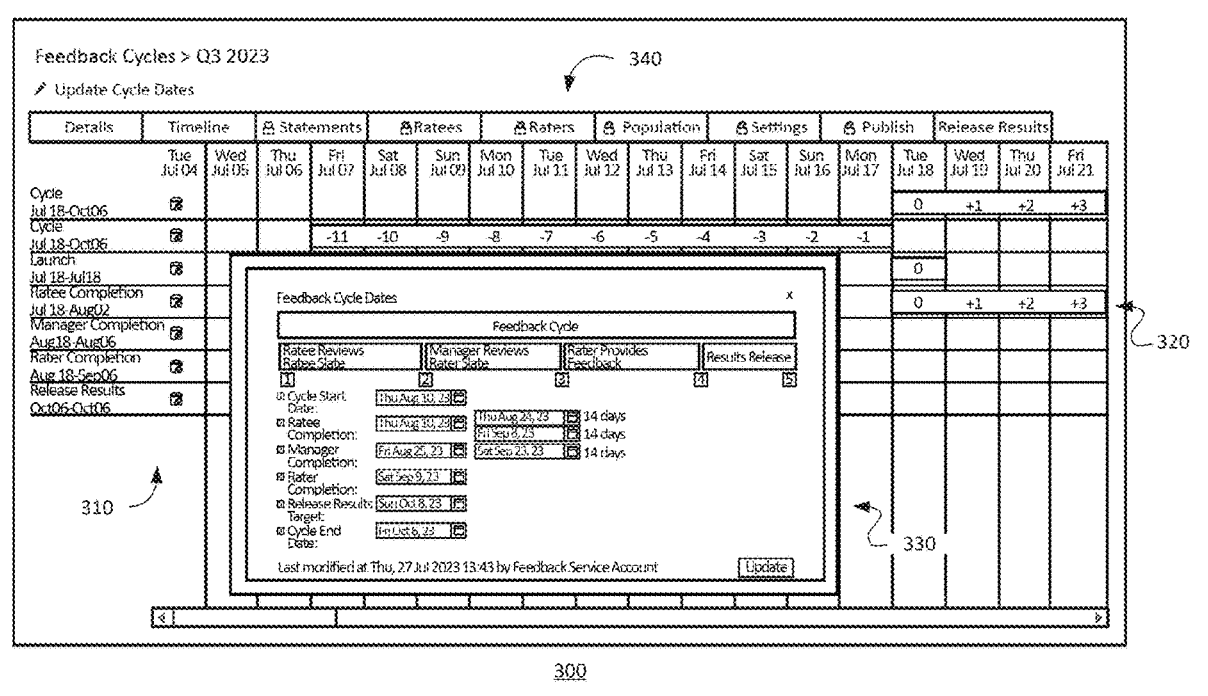
Figure 4:
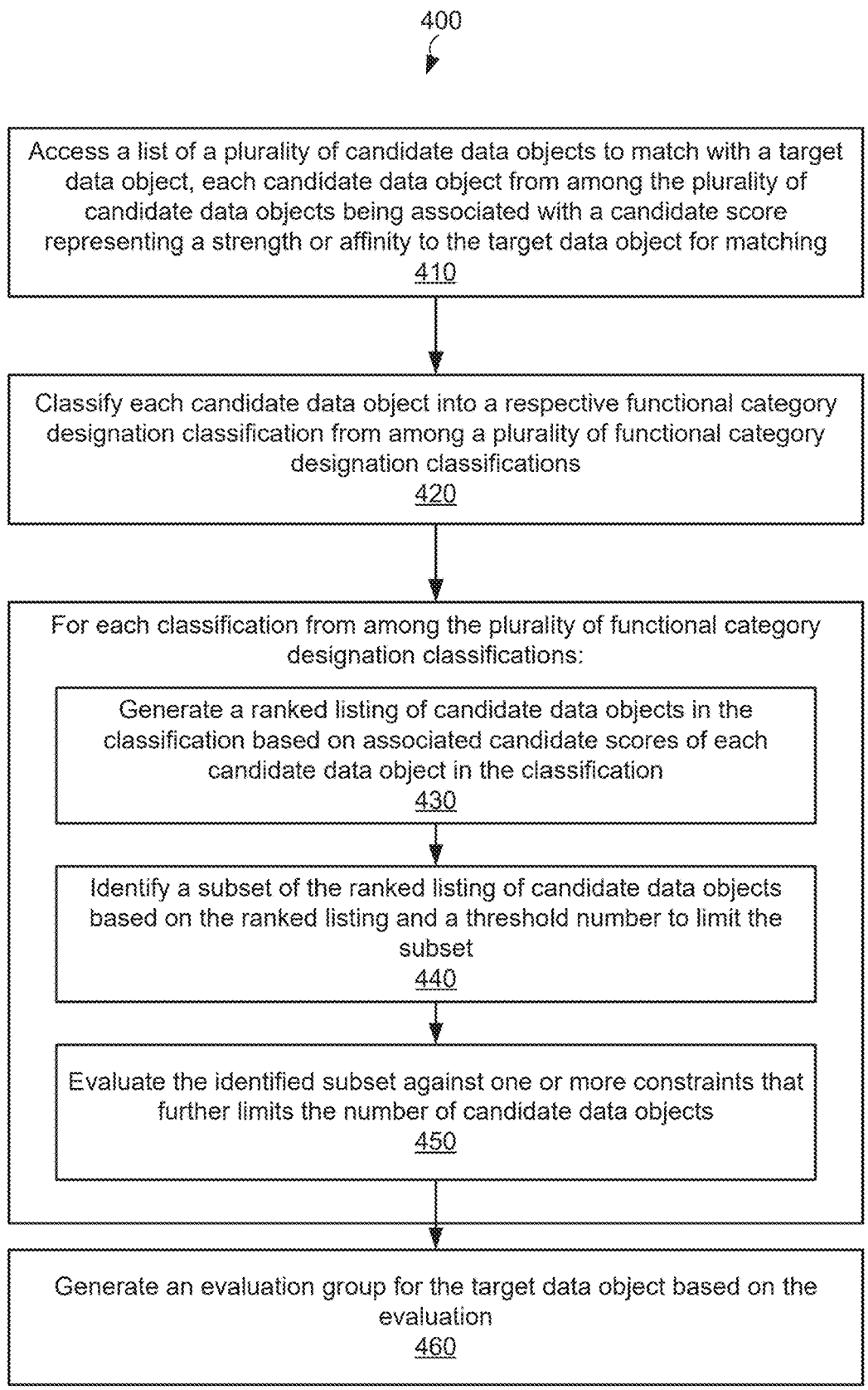
FIG. 4 depicts an example method for providing evaluation requests, in accordance with at least one embodiment.

FIG. 3 depicts an illustrative graphical user interface 300 of a platform implementing systems and methods described herein, in accordance with at least one embodiment. For example, graphical user interface (GUI) 300 represents an illustrative tool for setting feedback cycle timelines, in accordance with at least one embodiment. In particular, GUI 300 depicts an example interface of evaluation request application 115 for setting a timeline for various stages of the feedback cycle (310) and a visual depiction of those timelines (320). In some embodiments, evaluation request application 115 may be configured to automatically set each stage to a default time frame, e.g., two-week intervals. In some embodiments, time frames may be adjusted manually and/or automatically, for example, based on additional information, criteria, or rules. In some embodiments, end dates may indicate when the cycle timeline may be auto-advanced to a next stage (e.g., at 11:59:59 PM ET). In some embodiments, the start date for the next stage may be automatically set to the subsequent date. In some embodiments, dates for stages may be adjusted using date editor 330 once a feedback cycle has been started, as long as the date has not passed. In some embodiments, other features of the systems and methods described herein may be accessed, viewed, implemented, and/or updated via tabs 340 of GUI 300. FIG. 4 depicts an example method 400 for providing evaluation requests, in accordance with at least one embodiment. In various embodiments, method 400 may be implemented by evaluation coordination system 100, executing code in one or more processors therein. For example, in some embodiments, method 400 may be performed on a computer (e.g., computer system 1000 of FIG. 5) having one or more processors (e.g., processor(s) 1010 of FIG. 5) and memory (e.g., system memory 1020 of FIG. 5), and one or more code sets, applications, programs, modules, and/or other software stored in the memory and executing in or executed by one or more of the processor(s).

At 410, a processor (e.g., of evaluation server 110) may access a list of a plurality of candidate data objects to match with a target data object, each candidate data object from among the plurality of candidate data objects being associated with a candidate score representing a strength or affinity to the target data object for matching. To illustrate, various examples of 410-460 will be described in the context in which each candidate data object from among the plurality of candidate respectively represents a potential evaluator, the target data object represents a target individual, and the evaluation group represents a grouping of evaluators that are automatically recommended to evaluate the target individual. In particular, accessing a list of plurality of candidate data objects may include obtaining an interaction listing for a target individual at an organization, wherein the interaction listing comprises a plurality of potential evaluators for the target individual, wherein each potential evaluator is associated with a score representing a volume of interactions between the potential evaluator and the target individual over a period of time. The score may be used as a strength or affinity between the target individual and the potential evaluator.

At 420, the processor may classify each candidate data object into a respective functional category designation classification from among a plurality of functional category designation classifications. As used herein, the term classify means to categorize the candidate data object into one or more of a plurality of functional category designation classifications. In examples for which the each candidate data object represents a respective potential evaluator and the target data object represents a target individual, classifying the candidate data object may include obtaining an indication that the respective potential evaluator is a member of one or more of the following groups: an organizational group to which the target individual belongs; an organizational group to which the target individual does not belong; an enterprise organizational group; and a group of individuals related to a feature associated with the ratee.

For each classification from among the plurality of functional category designation classifications, the processor may be configured to perform 430-450.

At 430, the processor may generate a ranked listing of candidate data objects in the classification based on associated candidate scores of each candidate data object in the classification.

At 440, the processor may identify a subset of the ranked listing of candidate data objects based on the ranked listing and a threshold number to limit the subset.

At 450, the processor may evaluate the identified subset against one or more constraints that further limits the number of candidate data objects. For example, evaluating the identified subset against one or more constraints comprises, for each candidate data object in the subset: determining whether one or more of the following criteria is satisfied: the respective potential evaluator has already been selected for the target individual; the respective potential evaluator has been selected to evaluate at least a threshold number of total individuals during an evaluation cycle; an organization rank for the respective potential evaluator does not exceed a threshold value; the organization rank for the respective potential evaluator exceeds a second threshold value; the respective potential evaluator is located in a certain jurisdiction; or the respective potential evaluator has not worked for the organization for more than a threshold period of time.

At 460, the processor may generate an evaluation group for the target data object based on the evaluation. For example, the processor may generate the evaluation group based on the evaluation 450 for each of the classifications. Once the evaluation group, which may include potential evaluators in some examples, is generated, the processor may generate an evaluation request for the target individual and provide the evaluation request to each respective potential evaluator in the evaluation group. In particular, the processor may automatically (such as without human intervention) provide the evaluation request to each respective potential evaluator in the evaluation group.

In some examples, the processor may receive one or more changes to a composition of the evaluation group from a manager for the target individual. The one or more changes may include an indication to add an additional potential evaluator to the evaluation group where the additional potential evaluator is associated with one or more of the plurality of categories or an indication to remove one or more of the respective potential evaluators from the evaluation group.

In some examples, the processor may receive one or more changes to a composition of the evaluation group from the target individual. The one or more changes may include an indication to add an additional potential evaluator to the evaluation group where the additional potential evaluator is associated with one or more of the plurality of functional category designation classifications, or an indication to remove one or more of the respective potential evaluators from the evaluation group.

Figure 5:
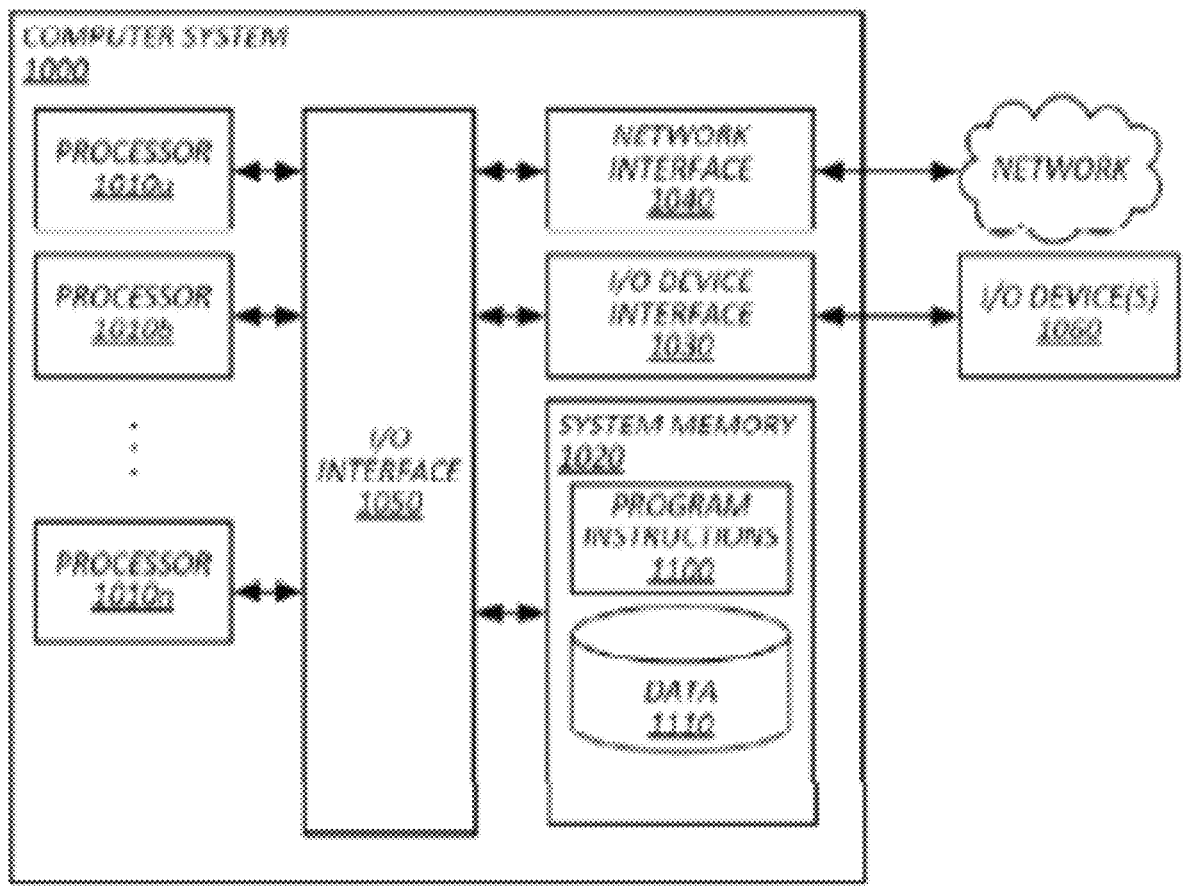
FIG. 5 depicts an example computer system on which systems and methods described herein may be executed, in accordance with at least one embodiment.

Some embodiments may execute the above operations on a computer system, such as the computer system of FIG. 5, which is a diagram that illustrates a computing system 1000 in accordance with embodiments of the present techniques. Various portions of systems and methods described herein, may include or be executed on one or more computer systems similar to computing system 1000. Further, processes and modules described herein may be executed by one or more processing systems similar to that of computing system 1000.

Computing system 1000 may include one or more processors (e.g., processors 1010a-1010n) coupled to system memory 1020, an input/output I/O device interface 1030, and a network interface 1040 via an input/output (I/O) interface 1050. A processor may include a single processor or a plurality of processors (e.g., distributed processors). A processor may be any suitable processor capable of executing or otherwise performing instructions. A processor may include a central processing unit (CPU) that carries out program instructions to perform the arithmetical, logical, and input/output operations of computing system 1000. A processor may execute code (e.g., processor firmware, a protocol stack, a database management system, an operating system, or a combination thereof) that creates an execution environment for program instructions. A processor may include a programmable processor. A processor may include general or special purpose microprocessors. A processor may receive instructions and data from a memory (e.g., system memory 1020). Computing system 1000 may be a uni-processor system including one processor (e.g., processor 1010a), or a multi-processor system including any number of suitable processors (e.g., 1010a-1010n). Multiple processors may be employed to provide for parallel or sequential execution of one or more portions of the techniques described herein. Processes, such as logic flows, described herein may be performed by one or more programmable processors executing one or more computer programs to perform functions by operating on input data and generating corresponding output. Processes described herein may be performed by, and apparatus may also be implemented as, special purpose logic circuitry, e.g., an FPGA (field programmable gate array) or an ASIC (application specific integrated circuit). Computing system 1000 may include a plurality of computing devices (e.g., distributed computer systems) to implement various processing functions.

I/O device interface 1030 may provide an interface for connection of one or more I/O devices 1060 to computer system 1000. I/O devices may include devices that receive input (e.g., from a user) or output information (e.g., to a user). I/O devices 1060 may include, for example, graphical user interface presented on displays (e.g., a cathode ray tube (CRT) or liquid crystal display (LCD) monitor), pointing devices (e.g., a computer mouse or trackball), keyboards, keypads, touchpads, scanning devices, voice recognition devices, gesture recognition devices, printers, audio speakers, microphones, cameras, or the like. I/O devices 1060 may be connected to computer system 1000 through a wired or wireless connection. I/O devices 1060 may be connected to computer system 1000 from a remote location. I/O devices 1060 located on remote computer system, for example, may be connected to computer system 1000 via a network and network interface 1040.

Network interface 1040 may include a network adapter that provides for connection of computer system 1000 to a network. Network interface 1040 may facilitate data exchange between computer system 1000 and other devices connected to the network. Network interface 1040 may support wired or wireless communication. The network may include an electronic communication network, such as the Internet, a local area network (LAN), a wide area network (WAN), a cellular communications network, or the like.

System memory 1020 may be configured to store program instructions 1100 or data 1110. Program instructions 1100 may be executable by a processor (e.g., one or more of processors 1010a-1010n) to implement one or more embodiments of the present techniques. Instructions 1100 may include modules of computer program instructions for implementing one or more techniques described herein with regard to various processing modules. Program instructions may include a computer program (which in certain forms is known as a program, software, software application, script, or code). A computer program may be written in a programming language, including compiled or interpreted languages, or declarative or procedural languages. A computer program may include a unit suitable for use in a computing environment, including as a stand-alone program, a module, a component, or a subroutine. A computer program may or may not correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one or more computer processors located locally at one site or distributed across multiple remote sites and interconnected by a communication network.

System memory 1020 may include a tangible program carrier having program instructions stored thereon. A tangible program carrier may include a non-transitory computer readable storage medium. A non-transitory computer readable storage medium may include a machine-readable storage device, a machine-readable storage substrate, a memory device, or any combination thereof. Non-transitory computer readable storage medium may include non-volatile memory (e.g., flash memory, ROM, PROM, EPROM, EEPROM memory), volatile memory (e.g., random access memory (RAM), static random access memory (SRAM), synchronous dynamic RAM (SDRAM)), bulk storage memory (e.g., CD-ROM and/or DVD-ROM, hard-drives), or the like. System memory 1020 may include a non-transitory computer readable storage medium that may have program instructions stored thereon that are executable by a computer processor (e.g., one or more of processors 1010a-1010n) to cause the subject matter and the functional operations described herein. A memory (e.g., system memory 1020) may include a single memory device and/or a plurality of memory devices (e.g., distributed memory devices). Instructions or other program code to provide the functionality described herein may be stored on a tangible, non-transitory computer readable media. In some cases, the entire set of instructions may be stored concurrently on the media, or in some cases, different parts of the instructions may be stored on the same media at different times.

I/O interface 1050 may be configured to coordinate I/O traffic between processors 1010a-1010n, system memory 1020, network interface 1040, I/O devices 1060, and/or other peripheral devices. I/O interface 1050 may perform protocol, timing, or other data transformations to convert data signals from one component (e.g., system memory 1020) into a format suitable for use by another component (e.g., processors 1010a-1010n). I/O interface 1050 may include support for devices attached through various types of peripheral buses, such as a variant of the Peripheral Component Interconnect (PCI) bus standard or the Universal Serial Bus (USB) standard.

Embodiments of the techniques described herein may be implemented using a single instance of computer system

1000 or multiple computer systems 1000 configured to host different portions or instances of embodiments. Multiple computer systems 1000 may provide for parallel or sequential processing/execution of one or more portions of the techniques described herein.

Those skilled in the art will appreciate that computer system 1000 is merely illustrative and is not intended to limit the scope of the techniques described herein. Computer system 1000 may include any combination of devices or software that may perform or otherwise provide for the performance of the techniques described herein. For example, computer system 1000 may include or be a combination of a cloud-computing system, a data center, a server rack, a server, a virtual server, a desktop computer, a laptop computer, a tablet computer, a server device, a client device, a mobile telephone, a personal digital assistant (PDA), a mobile audio or video player, a game console, a vehicle-mounted computer, or a Global Positioning System (GPS), or the like. Computer system 1000 may also be connected to other devices that are not illustrated, or may operate as a stand-alone system. In addition, the functionality provided by the illustrated components may in some embodiments be combined in fewer components or distributed in additional components. Similarly, in some embodiments, the functionality of some of the illustrated components may not be provided or other additional functionality may be available.

Those skilled in the art will also appreciate that while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1000 may be transmitted to computer system 1000 via transmission media or signals such as electrical, electromagnetic, or digital signals, conveyed via a communication medium such as a network or a wireless link. Various embodiments may further include receiving, sending, or storing instructions or data implemented in accordance with the foregoing description upon a computer-accessible medium. Accordingly, the present techniques may be practiced with other computer system configurations.

In block diagrams, illustrated components are depicted as discrete functional blocks, but embodiments are not limited to systems in which the functionality described herein is organized as illustrated. The functionality provided by each of the components may be provided by software or hardware modules that are differently organized than is presently depicted, for example such software or hardware may be intermingled, conjoined, replicated, broken up, distributed (e.g., within a data center or geographically), or otherwise differently organized. The functionality described herein may be provided by one or more processors of one or more computers executing code stored on a tangible, non-transitory, machine readable medium. In some cases, notwithstanding use of the singular term "medium," the instructions may be distributed on different storage devices associated with different computing devices, for instance, with each computing device having a different subset of the instructions, an implementation consistent with usage of the singular term "medium" herein. In some cases, external (e.g., third party) content delivery networks may host some or all of the information conveyed over networks, in which case, to the extent information (e.g., content) is said to be supplied or otherwise provided, the information may be provided by sending instructions to retrieve that information from a content delivery network.

The reader should appreciate that the present application describes several independently useful techniques. Rather than separating those techniques into multiple isolated patent applications, applicants have grouped these techniques into a single document because their related subject matter lends itself to economies in the application process. But the distinct advantages and aspects of such techniques should not be conflated. In some cases, embodiments address all of the deficiencies noted herein, but it should be understood that the techniques are independently useful, and some embodiments address only a subset of such problems or offer other, unmentioned benefits that will be apparent to those of skill in the art reviewing the present disclosure. Due to costs constraints, some techniques disclosed herein may not be presently claimed and may be claimed in later filings, such as continuation applications or by amending the present claims. Similarly, due to space constraints, neither the Abstract nor the Summary sections of the present document should be taken as containing a comprehensive listing of all such techniques or all aspects of such techniques.

It should be understood that the description and the drawings are not intended to limit the present techniques to the particular form disclosed, but to the contrary, the intention is to cover all modifications, equivalents, and alternatives falling within the spirit and scope of the present techniques as defined by the appended claims. Further modifications and alternative embodiments of various aspects of the techniques will be apparent to those skilled in the art in view of this description. Accordingly, this description and the drawings are to be construed as illustrative only and are for the purpose of teaching those skilled in the art the general manner of carrying out the present techniques. It is to be understood that the forms of the present techniques shown and described herein are to be taken as examples of embodiments. Elements and materials may be substituted for those illustrated and described herein, parts and processes may be reversed or omitted, and certain features of the present techniques may be utilized independently, all as would be apparent to one skilled in the art after having the benefit of this description of the present techniques. Changes may be made in the elements described herein without departing from the spirit and scope of the present techniques as described in the following claims. Headings used herein are for organizational purposes only and are not meant to be used to limit the scope of the description.

As used throughout this application, the word "may" is used in a permissive sense (i.e., meaning having the potential to), rather than the mandatory sense (i.e., meaning must). The words "include", "including", and "includes" and the like mean including, but not limited to. As used throughout this application, the singular forms "a," "an," and "the" include plural referents unless the content explicitly indicates otherwise. Thus, for example, reference to "an element" or "a element" includes a combination of two or more elements, notwithstanding use of other terms and phrases for one or more elements, such as "one or more." The term "or" is, unless indicated otherwise, non-exclusive, i.e., encompassing both "and" and "or." Terms describing conditional relationships, e.g., "in response to X, Y," "upon X, Y,", "if X, Y," "when X, Y," and the like, encompass causal relationships in which the antecedent is a necessary causal condition, the antecedent is a sufficient causal condition, or the antecedent is a contributory causal condition of the consequent, e.g., "state X occurs upon condition Y obtaining" is generic to "X occurs solely upon Y" and "X occurs upon Y and Z." Such conditional relationships are not limited to consequences that instantly follow the antecedent obtaining, as some consequences may be delayed, and in conditional statements, antecedents are connected to their consequents, e.g., the antecedent is relevant to the likelihood of the consequent occurring. Statements in which a plurality of attributes or functions are mapped to a plurality of objects (e.g., one or more processors performing steps A, B, C, and D) encompasses both all such attributes or functions being mapped to all such objects and subsets of the attributes or functions being mapped to subsets of the attributes or functions (e.g., both all processors each performing steps A-D, and a case in which processor 1 performs step A, processor 2 performs step B and part of step C, and processor 3 performs part of step C and step D), unless otherwise indicated. Similarly, reference to "a computer system" performing step A and "the computer system" performing step B may include the same computing device within the computer system performing both steps or different computing devices within the computer system performing steps A and B. Further, unless otherwise indicated, statements that one value or action is "based on" another condition or value encompass both instances in which the condition or value is the sole factor and instances in which the condition or value is one factor among a plurality of factors. Unless otherwise indicated, statements that "each" instance of some collection have some property should not be read to exclude cases where some otherwise identical or similar members of a larger collection do not have the property, i.e., each does not necessarily mean each and every. Limitations as to sequence of recited steps should not be read into the claims unless explicitly specified, e.g., with explicit language like "after performing X, performing Y," in contrast to statements that might be improperly argued to imply sequence limitations, like "performing X on items, performing Y on the X'ed items," used for purposes of making claims more readable rather than specifying sequence. Statements referring to "at least Z of A, B, and C," and the like (e.g., "at least Z of A, B, or C"), refer to at least Z of the listed categories (A, B, and C) and do not require at least Z units in each category. Unless specifically stated otherwise, as apparent from the discussion, it is appreciated that throughout this specification discussions utilizing terms such as "processing," "computing," "calculating," "determining" or the like refer to actions or processes of a specific apparatus, such as a special purpose computer or a similar special purpose electronic processing/computing device. Features described with reference to geometric constructs, like "parallel," "perpendicular/orthogonal," "square", "cylindrical," and the like, should be construed as encompassing items that substantially embody the properties of the geometric construct, e.g., reference to "parallel" surfaces encompasses substantially parallel surfaces. The permitted range of deviation from Platonic ideals of these geometric constructs is to be determined with reference to ranges in the specification, and where such ranges are not stated, with reference to industry norms in the field of use, and where such ranges are not defined, with reference to industry norms in the field of manufacturing of the designated feature, and where such ranges are not defined, features substantially embodying a geometric construct should be construed to include those features within 15% of the defining attributes of that geometric construct. The terms "first", "second", "third," "given" and so on, if used in the claims, are used to distinguish or otherwise identify, and not to show a sequential or numerical limitation. As is the case in ordinary usage in the field, data structures and formats described with reference to uses salient to a human need not be presented in a human-intelligible format to constitute the described data structure or format, e.g., text need not be rendered or even encoded in Unicode or ASCII to constitute text; images, maps, and data-visualizations need not be displayed or decoded to constitute images, maps, and data-visualizations, respectively; speech, music, and other audio need not be emitted through a speaker or decoded to constitute speech, music, or other audio, respectively. Computer implemented instructions, commands, and the like are not limited to executable code and may be implemented in the form of data that causes functionality to be invoked, e.g., in the form of arguments of a function or API call. To the extent bespoke noun phrases are used in the claims and lack a self-evident construction, the definition of such phrases may be recited in the claim itself, in which case, the use of such bespoke noun phrases should not be taken as invitation to impart additional limitations by looking to the specification or extrinsic evidence.

In this patent, to the extent any U.S. patents, U.S. patent applications, or other materials (e.g., articles) have been incorporated by reference, the text of such materials is only incorporated by reference to the extent that no conflict exists between such material and the statements and drawings set forth herein. In the event of such conflict, the text of the present document governs, and terms in this document should not be given a narrower reading in virtue of the way in which those terms are used in other materials incorporated by reference.

While the systems and methods described herein have generally be described with respect to a single legacy language being translated to a modernized coding language (e.g., one-to-one translation of a first language to a second language), in various embodiments, the same processes may be implemented in a one-to-many framework. For example, in some embodiments, a user may indicate one or more second languages to which a first language is to be translated. Additionally or alternatively, in some embodiments, one or more translation recommendations may be provided (as described herein) for multiple translations. In either event, embodiments of the systems and methods described herein may be configured to process multiple translations, e.g., in parallel and/or in series (e.g., based on an identified priority), as described herein.

This written description uses examples to disclose the implementations, including the best mode, and to enable any person skilled in the art to practice the implementations, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method, comprising:
    accessing, via one or more processors, a list of a plurality of candidate data objects to match with a target data object, each candidate data object from among the plurality of candidate data objects being associated with a candidate score representing a strength or affinity to the target data object for matching;
  wherein each candidate data object from among the plurality of candidate data objects respectively represents a potential evaluator, and wherein the target data object represents a target individual; and
  wherein each candidate score is generated based on analysis of digital interaction data and is indicative of a volume of relevant interactions between a respective candidate data object and the target data object over a defined period of time, and encapsulates a nature and strength of a relationship between the respective candidate data object and the target data object using at least one of graph-based algorithms, centrality measures, or machine learning models;
classifying, by the one or more processors, each candidate data object into a respective functional category designation classification from among a plurality of functional category designation classifications;
for each classification from among the plurality of functional category designation classifications:
  generating, by the one or more processors, a ranked listing of candidate data objects in the classification based on associated candidate scores of each candidate data object in the classification;
  identifying, by the one or more processors, a subset of the ranked listing of candidate data objects based on the ranked listing and a threshold number to limit the subset;
  evaluating, by the one or more processors, the identified subset against one or more system-defined constraints comprising at least one of evaluator workload thresholds, jurisdictional limitations, or organizational rank boundaries, that further limits the number of candidate data objects; and
  generating, by the one or more processors, an evaluation group for the target data object based on the evaluation;
    wherein the evaluation group represents a grouping of evaluators, the evaluators having been selected by a processor based on evaluation constraints and automatically recommended to evaluate the target individual;
assigning, by the one or more processors, the evaluation group to the target data object;
generating, by the one or more processors, an evaluation request for the target individual; and
providing, by the one or more processors, the evaluation request to each respective potential evaluator in the evaluation group.

2. The method of claim 1, wherein classifying each candidate data object comprises obtaining an indication of whether the respective potential evaluator is a member of one or more of the following groups:
  an organizational group to which the target individual belongs;
  an organizational group to which the target individual does not belong;
  an enterprise organizational group; and
  a group of individuals related to a feature associated with the target individual.

3. The method of claim 1, wherein evaluating the identified subset against one or more constraints comprises, for each candidate data object in the subset:
  determining whether one or more of the following criteria is satisfied:
  the respective potential evaluator has already been selected for the target individual;
  the respective potential evaluator has been selected to evaluate at least a threshold number of total individuals during an evaluation cycle;
  an organization rank for the respective potential evaluator does not exceed a threshold value;
  the organization rank for the respective potential evaluator exceeds a second threshold value;
  the respective potential evaluator is located in a certain jurisdiction; or
  the respective potential evaluator has not worked for the organization for more than a threshold period of time.

4. The method of claim 1, further comprising:
  providing the evaluation request to each respective potential evaluator within the evaluation group comprises automatically providing the evaluation request to each respective potential evaluator with the evaluation request.

5. The method of claim 1, further comprising:
  receiving one or more changes to a composition of the evaluation group from a manager for the target individual.

6. The method of claim 5, wherein receiving one or more changes to the composition of the evaluation group comprises receiving:
  an indication to add an additional potential evaluator to the evaluation group where the additional potential evaluator is associated with one or more of the plurality of categories; or
  an indication to remove one or more of the respective potential evaluators from the evaluation group.

7. The method of claim 1, further comprising:
  receiving one or more changes to a composition of the evaluation group from the target individual.

8. The method of claim 7, wherein receiving one or more changes to the composition of the evaluation group comprises receiving:
  an indication to add an additional potential evaluator to the evaluation group where the additional potential evaluator is associated with one or more of the plurality of functional category designation classifications; or
  an indication to remove one or more of the respective potential evaluators from the evaluation group.

9. The method of claim 1, further comprising:
  receiving one or more changes to a composition of the evaluation group,
  wherein the one or more changes are received from the target individual or a manager for the target individual, and
  wherein the one or more changes comprise an indication to add an additional potential evaluator who is not associated with any of the functional category designation classifications.

10. A system, comprising:
  a computer comprising memory and one or more processors;
  one or more code sets stored in the memory and executed by the one or more processors, which, when executed, configure the one or more processors to:
    access a list of a plurality of candidate data objects to match with a target data object, each candidate data object from among the plurality of candidate data objects being associated with a candidate score representing a strength or affinity to the target data object for matching;
wherein each candidate data object from among the plurality of candidate data objects respectively represents a potential evaluator, and wherein the target data object represents a target individual; and
wherein each candidate score is generated based on analysis of digital interaction data and is indicative of a volume of relevant interactions between a respective candidate data object and the target data object over a defined period of time, and encapsulates a nature and strength of a relationship between the respective candidate data object and the target data object using at least one of graph-based algorithms, centrality measures, or machine learning models;
classify each candidate data object into a respective functional category designation classification from among a plurality of functional category designation classifications;
for each classification from among the plurality of functional category designation classifications:
generate a ranked listing of candidate data objects in the classification based on associated candidate scores of each candidate data object in the classification;
identify a subset of the ranked listing of candidate data objects based on the ranked listing and a threshold number to limit the subset;
evaluate the identified subset against one or more system-defined constraints comprising at least one of evaluator workload thresholds, jurisdictional limitations, or organizational rank boundaries, that further limits the number of candidate data objects; and
generate an evaluation group for the target data object based on the evaluation;
wherein the evaluation group represents a grouping of evaluators, the evaluators having been selected by a processor based on evaluation constraints and automatically recommended to evaluate the target individual;
assign the evaluation group to the target data object;
generate an evaluation request for the target individual; and
provide the evaluation request to each respective potential evaluator in the evaluation group.

11. The system of claim 10, wherein to classify each candidate data object, the one or more processors are further configured to: obtain an indication of whether the potential evaluator is a member of one or more of the following groups:
an organizational group to which the target individual belongs;
an organizational group to which the target individual does not belong;
an enterprise organizational group; and
a group of individuals related to a feature associated with the target individual.

12. The system of claim 10, wherein to evaluate the identified subset against one or more constraints, the one or more processors are further configured to, for each candidate data object in the subset: determine whether one or more of the following criteria is satisfied:

the respective potential evaluator has already been selected for the target individual;
the respective potential evaluator has been selected to evaluate at least a threshold number of total individuals during an evaluation cycle;
an organization rank for the respective potential evaluator does not exceed a threshold value;
the organization rank for the respective potential evaluator exceeds a second threshold value;
the respective potential evaluator is located in a certain jurisdiction; or
the respective potential evaluator has not worked for the organization for more than a threshold period of time.

13. The system of claim 10, wherein to provide the evaluation request to each respective potential evaluator within the evaluation group, the one or more processors are further configured to automatically provide each respective potential evaluator with the evaluation request.

14. The system of claim 10, wherein the one or more processors are further configured to:
receive one or more changes to a composition of the matched group from a manager for the target individual.

15. The system of claim 14, wherein to receive one or more changes to the composition of the evaluation group comprises, the one or more processors are further configured to receive:
an indication to add an additional potential evaluator to the evaluation group where the additional potential evaluator is associated with one or more of the plurality of categories; or
an indication to remove one or more of the respective potential evaluators from the evaluation group.

16. The system of claim 10, wherein the one or more processors are further configured to:
receive one or more changes to a composition of the matched group from the target individual.

17. The system of claim 16, wherein to receive one or more changes to the composition of the matched group comprises, the one or more processors are further configured to receive:
an indication to add an additional potential evaluator to the evaluation group where the additional potential evaluator is associated with one or more of the plurality of functional category designation classifications; or
an indication to remove one or more of the potential respective evaluators from the matched group.

18. The system of claim 10, wherein the one or more processors are further configured to:
receive one or more changes to a composition of the matched group,
wherein the one or more changes are received from the target individual or a manager for the target individual, and
wherein the one or more changes comprise an indication to add an additional potential evaluator who is not associated with any of the functional category designation classifications.

19. A non-transitory computer-readable medium storing computer-program instructions that, when executed by one or more processors, cause the one or more processors to:
access a list of a plurality of candidate data objects to match with a target data object, each candidate data object from among the plurality of candidate data objects being associated with a candidate score representing a strength or affinity to the target data object for matching;

wherein each candidate data object from among the plurality of candidate data objects respectively represents a potential evaluator, and wherein the target data object represents a target individual; and wherein each candidate score is generated based on analysis of digital interaction data and is indicative of a volume of relevant interactions between a respective candidate data object and the target data object over a defined period of time, and encapsulates a nature and strength of a relationship between the respective candidate data object and the target data object using at least one of graph-based algorithms, centrality measures, or machine learning models;

classify each candidate data object into a respective functional category designation classification from among a plurality of functional category designation classifications;

for each classification from among the plurality of functional category designation classifications:

generate a ranked listing of candidate data objects in the classification based on associated candidate scores of each candidate data object in the classification;

identify a subset of the ranked listing of candidate data objects based on the ranked listing and a threshold number to limit the subset;

evaluate the identified subset against one or more system-defined constraints comprising at least one of evaluator workload thresholds, jurisdictional limitations, or organizational rank boundaries, that further limits the number of candidate data objects; and generate an evaluation group for the target data object based on the evaluation;

wherein the evaluation group represents a grouping of evaluators, the evaluators having been selected by a processor based on evaluation constraints and automatically recommended to evaluate the target individual;

assign the evaluation group to the target data object;

generate an evaluation request for the target individual; and provide the evaluation request to each respective potential evaluator in the evaluation group.

* * * * *